United States Patent Office 3,113,921
Patented Dec. 10, 1963

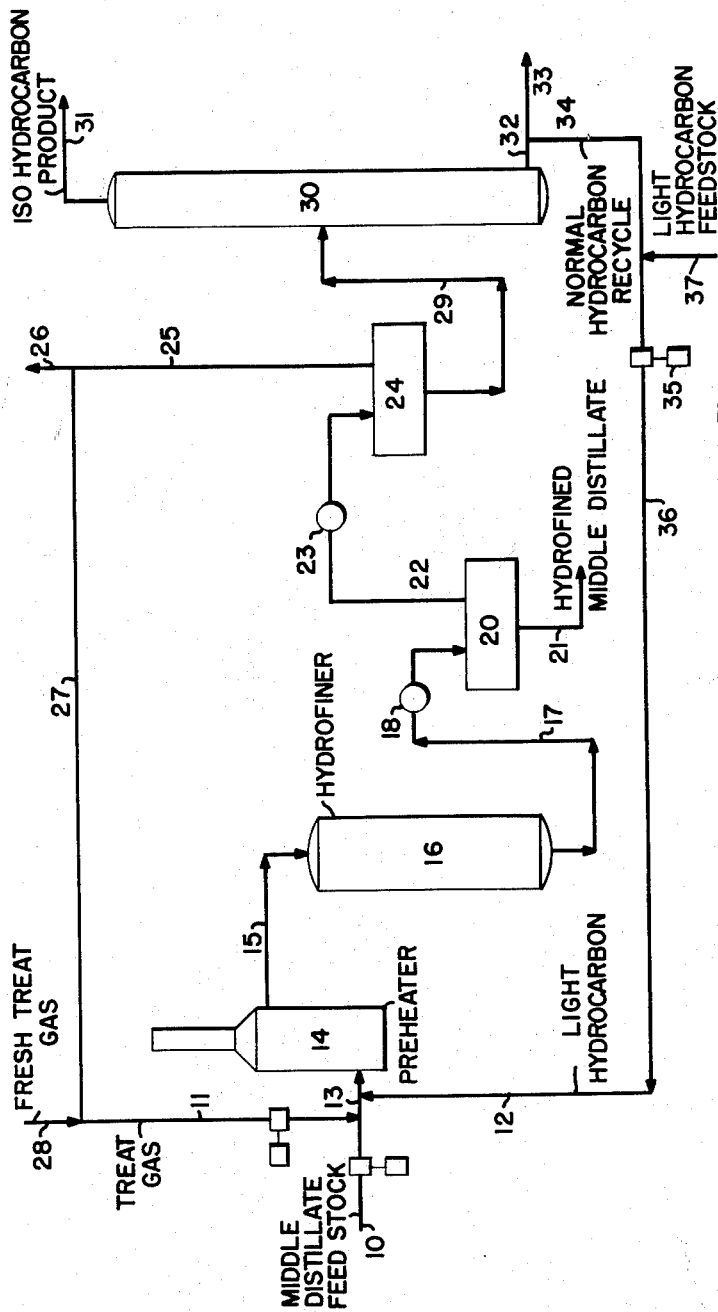

3,113,921
COMBINED HYDROCARBON CONVERSION
AND REFINING PROCESS
Charles E. Hemminger, Westfield, N.J., assignor to Esso
Research and Engineering Company, a corporation of
Delaware
Filed Aug. 17, 1960, Ser. No. 50,153
5 Claims. (Cl. 208—136)

This invention relates to the catalytic conversion of hydrocarbons. More specifically, this invention pertains to a particular method of isomerizing low boiling hydrocarbons containing about 4 to 7 carbon atoms per molecule and simultaneously hydrofining a middle distillate in the presence of hydrogen and a metal oxide or metal sulfide type hydrogenation catalyst.

Hydrofining is a well-known process for the treatment of a variety of hydrocarbon fractions in order to improve various properties thereof. For example, naphtha fractions are subjected to hydrofining to remove sulfur and nitrogen compounds which may interfere with, or adversely affect, the hydroforming of such naphtha fractions with platinum-alumina catalysts. Kerosene, heating oil, diesel fuel, lubricating oils as well as paraffin and microcrystalline waxes, are subjected to hydrofining to improve color, odor, burning characteristics, storage stability or the like. The hydrofining treatment comprises maintaining the particular material in liquid, vapor or mixed liquid-vapor form in admixture with hydrogen at elevated temperatures and pressures in contact with a suitable solid catalytic agent for a period sufficient to effect the desired improvement.

A variety of catalysts has been proposed for hydrofining such hydrocarbon feed stocks including molybdenum oxide, nickel-tungsten sulfide and, most frequently, cobalt molybdate or mixtures of cobalt oxide and molybdenum oxide dispersed upon an alumina-containing support or base, preferably activated or adsorptive alumina. In general, such catalysts are prepared by first forming adsorptive alumina particles in any suitable or known way and then compositing molybdenum oxide and cobalt oxide therewith. The molybdenum oxide can, for example, be added as a slurry or it may be applied as a solution of ammonium molybdate. The cobalt oxide is conveniently added as a salt such as cobalt nitrate or acetate, salts which are readily decomposed to cobalt oxide and volatile materials. The cobalt oxide and molybdenum oxide may be provided in equimolar amounts or a molecular excess of one over the other may be used. Suitable catalysts contain from about 5 to about 25 wt. percent cobalt oxide and molybdenum oxide with the ratio of the former to the latter in the range of from about one to five to about five to one. The activity of these catalysts may, if desired, be improved by sulfiding the same prior to use as by treating the same with a suitable sulfiding agent such as hydrogen sulfide, carbon disulfide, ethyl mercaptan, sour gas oil (containing 1.0 to 3.0 wt. percent sulfur) or the like, preferably in the present of hydrogen. The amount of sulfur added is preferably at least 25% of the stoichiometric quantity necessary to convert the catalytic metal oxides to the corresponding sulfides.

The effectiveness of the simultaneous hydrofining and isomerization is increased by having a halogen component in the catalyst as fluorine or chlorine in the range of 0.5 to 2 percent. A 13–25% $Al_2O_3$—$SiO_2$ support instead of alumina is a useful alternate catalyst composition.

The hydrofining reaction conditions vary somewhat depending upon the nature of the feed stock, the character of the catalyst, the character and quantity of the impurity or contaminant to be removed and the degree of improvement desired.

The hydrofining reaction conditions for a variety of feed stocks with which the low boiling hydrocarbons may be treated in accordance with the present invention are summarized in the following table.

| Feed | Kerosene | Diesel | Gas Oil |
|---|---|---|---|
| Reaction Temp., °F | 600–750 | 600–750 | 600–800 |
| (Preferred) | (650) | (650) | (700) |
| Reaction Pressure, p.s.i.g | 50–600 | 50–800 | 50–1,500 |
| (Preferred) | (200) | (200) | (400) |
| Feed Rate, v.v./hr | 1–20 | 0.25–10 | 0.25–5 |
| (Preferred) | (2–4) | (1) | (1) |
| Treat Gas Rate, s.c.f./b | 30–3,000 | 30–3,000 | 30–3,000 |
| (Preferred) | (500) | (700) | (1,000) |
| Hydrogen Consumption, s.c.f./b | 1–600 | 1–1,000 | 1–1,000 |
| (Usual) | (50) | (100) | (150) |

In accordance with this invention light hydrocarbons containing about 4 to 7 carbon atoms per molecule are added to middle distillate hydrofiner feeds in order that they may be isomerized in the same reaction zone and under the same conditions as are utilized to hydrofine the middle distillate feed stocks. Middle distillates used as feeds to hydrofiner units boil in the range of from about 300 to about 700° F. and may, for example, be kerosene fractions, jet fuel, diesel oil, gas oil, or the like. Normal $C_5$, $C_6$ and $C_7$ fractions for addition to said middle distillate feed stocks may be readily prepared by selective adsorption in molecular sieves or calcium aluminum silicates having relatively uniformly sized pore openings of about 5 A. diameter or a suitable feed stream can be more cheaply prepared by fractionation as by fractionating out only isopentane from a $C_5$ cut so that residual normal pentane therein may be isomerized in accordance with this invention.

The principal utility of the process is in refinery operations where the higher octane $C_5$, $C_6$ and $C_7$ isoparaffins, alone or together, are separated away from the normal paraffins to prepare premium high octane fuels. Then, it is desirable to convert the remaining normal paraffins to a higher octane blending component for regular gasoline by partial conversion to the equilibrium iso/normal paraffins ratio without involving expensive new isomerization units to obtain a high iso-normal paraffin ratio.

When the normal paraffins are added to the hydrofining operations, the concentration is in the order of 10 to 30 volume percent of the total feed. The liquid space velocity of the hydrofiner feed, say a diesel oil, is descreased accordingly to give the same contact time as required in the absence of the light hydrocarbons. The preferred operating pressures are higher in the presence of the light hydrocarbons as follows:

|  | No Light Hydrocarbons | Light Hydrocarbons Fed |
|---|---|---|
| Kerosene | 200 | 300 |
| Diesel | 200 | 400 |
| Gas Oil | 400 | 600 |

The severity of treatment in hydrofining as measured by temperature of operation is a function of the character of the stock and the degree of hydrofining required. In general, desulfurization of heavier feeds such as the diesel oil and gas oil with the light hydrocarbons present is essentially the same as obtained without them with otherwise identical operating conditions including the same contact time of the heavy oil.

In the hydrofining of the foregoing hydrocarbon fractions under the aforesaid conditions, there is a gradual deactivation of the catalyst due to the accumulation of carbonaceous or other deactivating deposits thereon. This deactivation can be partially, or at least temporarily compensated for by increasing the reaction temperature.

Eventually, however, the activity of the catalyst falls to such a low level that it becomes necessary to regenerate or reactivate the catalyst. This can be readily accomplished by discontinuing the supply of reactants, stripping hydrogen and hydrocarbon materials from the catalyst particles with steam and then regenerating the catalyst by burning the carbonaceous deposits therefrom with a mixture of air and a diluent such as steam or flue gas to control or limit the temperature reached in burning to below about 850–900° F. The regenerated catalyst, after resulfiding if necessary or desired, may then be used again in the hydrofining-isomerization process of this invention. Where fluorine is a constituent of the catalyst, any loss of this material can be restored by having a fluoride compound as HF with the sulfiding agent.

Reference is made to the accompanying drawing illustrating a diagrammatic flow plan in accordance with the present invention.

In the drawing, 10 is the inlet line through which the liquid hydrofiner feed stock such as kerosene, diesel fuel, gas oil or the like is charged to the system. Hydrogen-rich treat gas is supplied via line 11 and light hydrocarbons such as a $C_5$ cut is supplied through line 12. The resultant mixture is passed via line 13 to preheater 14 wherein the reactants are heated to a temperature suitable for charging through line 15 to hydrofiner 16. It will be understood that these streams may be preheated separately for charging to the hydrofiner or, for example, if the liquid hydrofiner stream is withdrawn directly from a distillation unit and is already at a temperature of 300° F. or more, that it may be possible to pass only the treat gas and the light hydrocarbons singly or in admixture through the preheater in order to achieve the desired inlet temperature to the hydrofiner unit.

The hydrofiner unit 16 is charged with a suitable catalyst composition preferably a cobalt oxide-molybdenum oxide alumina composition to which about 1 to 1.5 wt. percent of fluorine or chlorine has been added. The reaction conditions in hydrofiner 16 are as set forth above and the residence time or space velocity through the hydrofiner is controlled to give the desired improvement in the liquid hydrofiner feed stock.

The reaction products are withdrawn from the hydrofiner through line 17, cooled in 18 and passed to separator 20. The hydrofined liquid products are withdrawn from separator 20 through line 21 and sent to product storage. Temperature conditions in separator 20 are such, i.e., at least 200° F., so that the light hydrocarbons as well as the hydrogen or other gaseous products are taken overhead via line 22 and cooled in 23 sufficiently to condense the $C_5$ hydrocarbons and discharged into separator 24. The hydrogen, gaseous reaction products such as hydrogen sulfide and ammonia and $C_1$–$C_3$ hydrocarbons are taken overhead from separator 24 via line 25. Part of the gaseous products are vented through outlet line 26 in order to prevent the buildup of too large a concentration of hydrogen sulfide and/or ammonia. The remainder of the gaseous products is recycled through line 27 to inlet line 11 to which fresh hydrogen-rich gas is supplied via line 28.

The condensed $C_5$ products are withdrawn from separator 24 through line 29 and charged to fractionator 30 wherein they are fractionated to separate the iso-$C_5$ products taken overhead through line 31 from the normal $C_5$ hydrocarbons withdrawn through line 32 and either rejected through line 33 or recycled via line 34, pump 35 and line 36 to inlet line 12. Light hydrocarbon feed stock is supplied to the system through feed inlet line 37. It should be noted that the flow plan just described is specific for an operation in which a single fraction or $C_5$-cut, which can be readily distilled and recycled is used. With $C_6$ or $C_7$ cuts or a mixed $C_5$–$C_7$ feed, it is preferable to conduct a single pass operation, i.e., without distillation and recycle of the normal hydrocarbons.

The following example is illustrative of the present invention.

| | Light Hydrocarbon Feed | |
|---|---|---|
| | No | Yes |
| Vol. percent n-pentane in feed | 0 | 15 |
| Gas oil feed: | | |
| °API—35.2. | | |
| IBP—307° F. | | |
| 50%—561° F. | | |
| FBP—660° F. | | |
| Wt. percent sulfur=1.36. | | |
| Light hydrocarbon feed: | | |
| n-$C_5$—82%. | | |
| i-$C_5$—10%. | | |
| n-$C_6$—3%. | | |
| i-$C_6$—4%. | | |
| Operating Condition: | | |
| Catalyst—3% Co, 10% Mo on $Al_2O_3$. | | |
| Temperature, ° F | 700 | 700 |
| Pressure, p.s.i.g | 200 | 400 |
| Feed rate, v./v./hr | 2.0 | 1.7 |
| $H_2$ gas rate, c.f./bbl | 1,000 | 1,000 |
| $H_2$ concentration, percent | 70 | 70 |
| Product: Gas oil, wt. percent sulfur | .13 | .15 |
| Light Hydrocarbon: | | |
| n-$C_5$ | | 51 |
| i-$C_5$ | | 41 |
| n-$C_6$ | | 4 |
| i-$C_6$ | | 3 |

In the foregoing example the light hydrocarbon fraction was obtained as bottoms from a fractionator which produced an overhead fraction of isopentane for aviation and premium gasoline blending and therefore contained the small amount of $C_6$ hydrocarbons. The light hydrocarbon product can also be fed to the fractionator to increase the yield of isopentane when desired. Where a molecular sieve is employed or an isohexane tower is used to produce isohexane as well as isopentane from the virgin or catalytically reformed $C_5$–$C_6$ fraction, the concentration of the $C_6$ fraction can be increased in the light hydrocarbon feed. The ratio of $C_6$ isomers to normal hexane in the product is in the range of 0.8 to 1.2 under these conditions with methyl pentane isomers predominating. It is within the scope of the invention to feed normal butane alone or with a normal pentane cut as the light hydrocarbon feed.

The foregoing description contains a limited number of embodiments of the present invention. It will be understood that numerous variations are possible without departing from the scope of the following claims.

What is claimed is:

1. A process for hydrofining a middle hydrocarbon distillate and simultaneously isomerizing a normal $C_5$ hydrocarbon fraction, which comprises mixing a middle distillate with from about 10 to about 30 volume percent based on the total volume of the feed stock of a normal $C_5$ hydrocarbon fraction containing a major proportion of normal pentane, adding hydrogen to the resulting mixture, passing the resulting mixture through a reaction zone in contact with a cobalt oxide-molybdenum oxide hydrogenation catalyst containing about 0.5 to 2.0% of a halogen, said reaction zone being maintained under hydrofining conditions to consume hydrogen and at a temperature between about 600° F. and 800° F. and a pressure between about 250 p.s.i.g. and 1500 p.s.i.g., maintaining the reaction mixture in said reaction zone for a period sufficient to hydrofine the middle distillate and to effect substantial isomerization of the normal $C_5$ hydrocarbon fraction at the same time and separating a $C_5$ hydrocarbon fraction containing an increased amount of isomerized $C_5$ hydrocarbons from the hydrofined middle distillate.

2. A process for hydrofining a middle hydrocarbon distillate and simultaneously isomerizing a normal $C_5$ hydrocarbon fraction, which comprises mixing a middle distillate with from about 10 to about 30 volume percent based on the total volume of the feed stock of a normal $C_5$ hydrocarbon fraction containing a major proportion of normal pentane, adding hydrogen to the resulting mixture, passing the resulting mixture through a reaction zone in contact with a cobalt oxide-molybdenum oxide hydrogenation catalyst, said reaction zone being maintained under hydrofining conditions to consume hydrogen and at a temperature between about 600° F. and 800° F. and a pressure between about 250 p.s.i.g. and 1500 p.s.i.g., maintaining the reaction mixture in said reaction zone for a period sufficient to hydrofine the middle distillate and to effect substantial isomerization of the normal $C_5$ hydrocarbon in said $C_5$ fraction at the same time, separating pentanes from the hydrofined middle distillate and recovering isopentane from the separated pentanes.

3. A process for hydrofining a middle hydrocarbon distillate and simultaneously isomerizing a normal $C_5$ hydrocarbon fraction, which comprises mixing a middle distillate having an initial boiling point of about 307° F. and a final boiling point of about 660° F. with from about 10 to about 30 volume percent based on the total volume of the feed stock of a normal $C_5$ hydrocarbon fraction containing a major proportion of normal pentane, adding hydrogen to the resulting mixture, passing the resulting mixture through a reaction zone in contact with a cobalt oxide-molybdenum oxide hydrogenation catalyst, said reaction zone being maintained under hydrofining conditions to consume hydrogen and at a temperature of about 700° F. and a pressure of about 400 p.s.i.g., maintaining the reaction mixture in said reaction zone for a period sufficient to hydrofine the middle distillate and to effect substantial isomerization of the normal $C_5$ hydrocarbon fraction at the same time, separating pentanes from the hydrofined middle distillate and fractionating the separated pentanes to separate isopentane from normal pentane.

4. In the process for hydrofining a middle distillate wherein the middle distillate is passed at an elevated temperature between about 600 and 800° F. and under a pressure between about 250 and 1500 p.s.i.g. through a hydrofining zone containing a cobalt oxide-molybdenum oxide hydrogenation catalyst containing about 0.5 to 2.0% of a halogen and in the presence of added hydrogen and wherein hydrogen is consumed during the hydrofining, the improvement which comprises admixing with the middle distillate about 10 to 30 volume percent of a $C_5$ hydrocarbon fraction containing a major proportion of normal pentane and based on the total volume of the feed stock, the normal pentane being isomerized during the hydrofining of the middle distillate in said hydrofining zone, separating the hydrofined middle distillate from a pentane fraction and fractionating the pentane fraction to separate isopentane from normal pentane.

5. In the process for hydrofining a middle distillate wherein the middle distillate is passed at an elevated temperature between about 600 and 800° F. and under a pressure between about 250 and 1500 p.s.i.g. through a hydrofining zone containing a cobalt oxide-molybdenum oxide hydrogenation catalyst and in the presence of added hydrogen and wherein hydrogen is consumed during the hydrofining, the improvement which comprises admixing with the middle distillate about 10 to 30 volume percent of a $C_5$ hydrocarbon fraction containing a major proportion of normal pentane and based on the total volume of the feed stock, the normal pentane being isomerized during the hydrofining of the middle distillate in said hydrofining zone, separating the hydrofined middle distillate from a pentane fraction and fractionating the pentane fraction to separate isopentane from normal pentane.

References Cited in the file of this patent

UNITED STATES PATENTS

| | | |
|---|---|---|
| 2,324,165 | Layng et al. | July 13, 1943 |
| 2,352,059 | Woog | June 20, 1944 |
| 2,416,894 | Barron | Mar. 4, 1947 |
| 2,695,866 | McGrath | Nov. 30, 1954 |
| 2,904,500 | Beuther et al. | Sept. 15, 1959 |
| 2,910,426 | Gluesenkamp et al. | Oct. 27, 1959 |
| 2,933,445 | Donnell et al. | Apr. 19, 1960 |
| 2,937,137 | MacLaren | May 17, 1960 |
| 3,003,950 | Van Ingen | Oct. 10, 1961 |